Dec. 3, 1963 A. A. HORAK 3,113,268
COHERENT MULTI-MODE REPEATER
Filed March 31, 1961
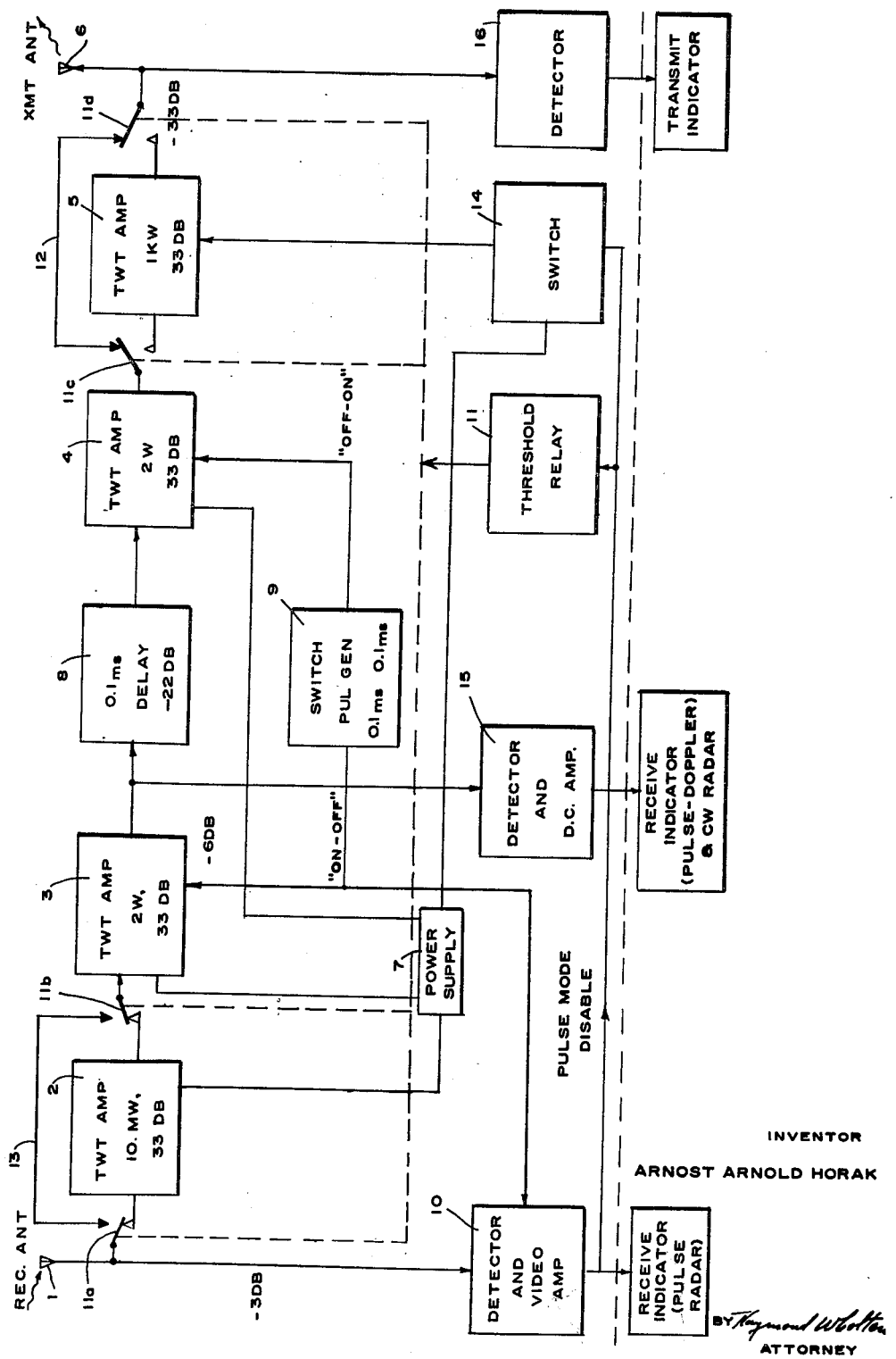
INVENTOR
ARNOST ARNOLD HORAK
BY Raymond Wootten
ATTORNEY

3,113,268
COHERENT MULTI-MODE REPEATER
Arnost Arnold Horak, Garland, Tex., assignor, by mesne assignments, to Ling-Temco-Vought, Inc., Dallas, Tex., a corporation of Delaware
Filed Mar. 31, 1961, Ser. No. 99,959
8 Claims. (Cl. 325—6)

The main purpose of this invention is to provide a suitable repeater for a "track-breaking" decoy which would capture and subsequently deviate the tracking "gates" of air defense radars. First, the repeater in the decoying missile captures and holds the "gates" of the air defense radars, and then the decoying missile is launched from a parent aircraft to provide the necessary deviation by separating physically from the parent aircraft. The objective is to deviate the "gates" of the air defense radars so that the associated air defense weapons or missiles are decoyed to a safe separation from the parent aircraft. This action, for example, can be used in bombardment aircraft penetrating into an enemy air defense complex. The decoying action reduces the number of enemy air defense intercepts and/or their probabilities-of-kill, and increases the probability-of-success of the bombardment mission.

It is therefore an object of this invention to provide a coherent, or "true," electromagnet signal enhancing repeater which would be compatible with a very large range of signal amplitudes and with a very broad spectrum of signal characteristics.

It is a further object of this invention to provide a repeater which is capable of enhancing (by reception, amplification, and re-transmission) pulse-Doppler and "continuous-wave" signals of low amplitude characteristics and/or pulse-modulated signals of high amplitude characteristics, without degrading, for practical purposes, the coherence or the true fidelity of the subject signals.

A further object of the invention is to provide a repeater of the above type which is capable of transmitting signals of high power while utilizing a moderate power supply.

When an electronic device is used as a repeater, it is usually highly desirable and in many cases mandatory, that the repeater be a "true" repeater. By this is meant that it must possess two important attributes; namely, (1) it must be a linear device where the output power is linearly proportional to the input power and (2) it must be a coherent device where the original phase structure of the received signal is preserved.

The first attribute requires that the repeater must be a constant gain device, regardless of the amplitude of the incoming signal, while the second attribute requires that differential phase shifts must be kept at a minimum, especially when pulsing, gating, and/or time multiplexing operations are employed. The enclosed block diagram of the coherent multi-mode repeater of this invention shows how the two highly desired, or mandatory, attributes are implemented.

The repeater as a whole is shown in the drawing above the dotted line and is mounted on a decoying missile or craft which is launched from the parent craft to capture and hold the gates of the enemy's tracking devices. The repeater comprises a receiving antenna 1 for receiving the enemy's tracking signals which may be of the continuous wave or pulse-Doppler type of relatively low amplitude or they may be pulse modulated signals of high amplitude characteristics. Between the receiving antenna 1 and the transmitting antenna 6 is provided a plurality of amplifiers 2, 3, 4 and 5 which are preferably of the travelling wave tube types well known in the art and capable of linearly amplifying electromagnetic waves of high frequency over a wide range of frequencies. The signal gains of the amplifiers are the same and are indicated in the drawing as an arbitrary value of 33 db. The gains of the amplifiers and the number of stages utilized are however, chosen in dependence upon the amplitude range of the incoming signals. The tubes are arranged in the chain in the order of their amplitude handling capacity, the first tube 2 being of relatively low power and the last tube 5 being of high power capacity. A power supply 7 is provided for energizing the tubes 2 to 5.

As shown in the drawing, the antenna is normally connected to the input of tube 2, the output of which is normally coupled to the input of amplifier tube 3. Between tubes 3 and 4 is coupled a delay device or network 8 having a predetermined time delay. The output terminals of tube 4 are shown as normally connected to the transmitting antenna 6. When the received signal is of low amplitude, such as that coming from a "CW" or pulse-Doppler radar, the first three tubes 2, 3 and 4 of the amplifier chain would be sufficient to accomplish the required amplification. In order to prevent feedback and avoid oscillation of the system as a whole, means are provided to pulse the transmitter antenna "off" while pulsing the receiving antenna "on" so that they are never on at the same time. For this purpose, a high frequency pulse generator 9 such as a multivibrator is provided, for alternately switching off tube 3 while switching on tube 4 and vice versa. The "off" and "on" times of the tubes are equal to the time delay of the delay device or network 8. While the pulsing switch 9 is shown as controlling the tubes 3, 4, such switch may be utilized in known manner to merely block and unblock the input and output transmission paths of the delay device 8. In this way, the coherency of the repeater is maintained while avoiding oscillations due to feedback.

If the received radar signal is of large amplitude such as that coming from a standard pulsed radar, the first three tubes 2, 3 and 4 would saturate and the required amplification of the signals would not be achieved. Overloading of the tubes might take place to such an extent that failure would occur. In order to avoid such saturation and overloading of the tubes, means are provided for automatically applying the signals from the receiving antenna directly to tube 3 and switching in tube 5 between the output of tube 4 and the transmitting antenna 6. These means comprise a detector 10 coupled to the receiving antenna 1 for monitoring the incoming signals and providing an output, the amplitude of which is dependent on the amplitude of the received signals. The output of the detector 10 is applied to a threshold relay 11 for controlling contacts 11a, 11b, 11c and 11d. Contacts 11a and 11b normally couple the input terminals of amplifier 2 to the receiving antenna 1 and its output terminals to amplifier 3 while contacts 11c and 11d couple the output of amplifier 4 to the transmitting antenna 6 through the transmission path 12. When signals of low amplitude, such as those coming from "CW" or pulse-Doppler radar are being received, the output of detector 10 is of insufficient amplitude to operate the threshold relay 11 and the relay contacts remain in the position shown in the drawing, the received signal being amplified by the first three tubes of the chain and applied to the transmitting antenna 6. If the received radar pulses are of large amplitude such as those coming from a standard pulsed radar, the output from detector 10 is of sufficient amplitude to energize the relay 11 to change over the contacts 11a–11d, such that the signals from the receiving antenna 1 are applied directly to amplifier 3 through transmission path 13 and the output signals from amplifier 4 are coupled to amplifier 5, the output of which is then coupled to transmitting antenna 6. Since the tubes in the chain are arranged in the order of their amplitude handling capacity and since the gain of each tube is the same, the required constant overall gain is preserved, regardless of the amplitude of the incoming signal, and linearity of operation is made possible. It is seen that the length of the chain used at any one time depends upon the required amplification, whereas the length of the overall chain depends upon the amplitude range of the incoming signals. In the block diagram, the repeater uses a total of four traveling-wave tube amplifiers with three being used at any one time. This covers the requirements for the repeater when used as a signal enhancer in a track-breaking decoy.

Instead of connecting and disconnecting amplifiers 2 and 5 into and out of the amplifier chain, it is apparent that they may be permanently connected in cascade between the receiving and transmitting antennas and the relay may be utilized for alternately short-circuiting the signal paths of the tubes 2 and 5 by connecting a bypass transmission line thereabout. The output of detector 10 also controls the switching device 14. As can be seen from the drawing, one of the terminals of the power supply 7 is connected to the swtich 14. During reception of pulsed radar signals of large amplitudes, the output pulses from detector 10 operate the switch device 14 to connect the power supply to the amplifier tube 5 for energizing it only for the duration of the pulse. In this way, the required amount of primary power supply is not only reduced but also makes possible the use of available travelling wave tubes having a limited duty-cycle but of high power. During the interval when the switch pulse generator 9 is operating to block the output signal transmission path of the delay device 8, the detector 10 may be receiving large amplitude pulses from the antenna 1 and providing output pulses of sufficient amplitude to operate switch 14 for keying on the power supply for tube 5. Since the application of power to energize the tube 5 at this time is unnecessary, the switch pulses from the pulse generator 9 for rendering the input signal path to the delay device 8 effective, are applied to the detector 10 to prevent the output voltage therefrom from operating the switch 14. The relay 11 may be of the slow-to-release type such that once the contacts 11a to 11d have been operated to switch in amplifier 5 and disconnect amplifier 2 by large amplitude pulses received by detector 10, this setting will not be disturbed by the "off-on" pulses from generator 9.

Also connected at an intermediate point in the amplifier circuit is a signal detector 15 for operating an indicator and a further indicator is connected to the signal monitoring detector 10. These indicators are especially useful in the track-breaking decoy of this invention for indicating whether the air defense radars are in the searching or tracking mode, whether the signal is the "CW," pulse-Doppler or the standard pulse type. The further indicator operated by detector 16 coupled to the transmitter antenna 6 provides an indication as to whether the repeater is functioning properly. The indicators are of course, removed from the repeater before the decoy in which the repeater is mounted, is launched.

Whereas only one specific form of the invention has been described with reference to the accompanying drawings, various modifications will be suggested to those skilled in the art and accordingly, the scope of the invention should not be restricted beyond that of the appended claims.

I claim:

1. In a high frequency repeater for continuous wave and pulse signals and having input and output terminals, a first plurality of amplifier stages coupled in cascade and having a predetermined overall gain and a low power handling capacity, a second plurality of amplifier stages coupled in cascade having the same overall gain as the first plurality but a high power handling capacity, and means for selectively connecting one of said pluralities of amplifier stages between the input and output terminals in dependence on the amplitude of the signals applied to the input terminals.

2. In a high frequency repeater for continuous wave and pulse signals and having input and output terminals, a first plurality of amplifier stages coupled in cascade and having a predetermined overall gain and a low power handling capacity, a second plurality of amplifier stages coupled in cascade having the same overall gain as the first plurality but a high power handling capacity, and means responsive to the amplitude of the signals at the input terminals for automatically and selectively coupling the first or second of said pluralities of amplifier stages between the input and output terminals in dependence on whether the amplitude of the signals is below or above a predetermined amplitude respectively.

3. In a high frequency repeater for continuous wave and pulse signals and having input and output terminals, a first plurality of amplifier stages coupled in cascade and having a predetermined overall gain and a low power handling capacity, a second plurality of amplifier stages coupled in cascade having the same overall gain as the first plurality but a high power handling capacity, said first plurality of amplifier stages being normally connected between the input and output terminals for amplifying signals below a predetermined amplitude applied to the input terminals, and means responsive to signals above said predetermined amplitude applied to the input terminals, for decoupling said first plurality of amplifier stages from between said terminals and coupling the second plurality therebetween.

4. A repeater for received high frequency signals comprising an amplifier chain having a plurality of amplifier stages coupled in cascade, means for applying received signals below a predetermined amplitude to a first amplifier stage and for transmitting amplified signals from the last amplifier stage, said first amplifier stage having a predetermined gain and a lower power handling capacity than the remaining amplifier stages, and means responsive to recevied signals above the predetermined amplitude for switching the received signals to a following amplifier stage and for coupling a further amplifier stage having the predetermined gain but a higher power handling capacity to the amplifier chain.

5. A repeater for received high frequency signals comprising an amplifier chain having a plurality of amplifier stages coupled in cascade, means for applying received signals below a predetermined amplitude to a first amplifier stage and for transmitting amplified signals from the last amplifier stage, said first amplifier stage having a predetermined gain and a lower power handling capacity than the remaining amplifier stages, and means responsive to received signals above the predetermined amplitude for switching the received signals to a second stage of said amplifier chain and for coupling a further amplifier stage between the said last amplifier stage and the means for transmitting amplified signals therefrom, said further amplifier stage having said predetermined gain but higher power handling capacity than the first stage.

6. A repeater according to claim 5 including a source of power for energizing said further amplifier stage and means controlled by the signal responsive means for rendering said power supply effective to energize said further amplifier stage only for the duration of received signal pulses exceeding the predetermined amplitude.

7. A coherent multi-mode repeater for received signals of the continuous wave and pulse types comprising a plurality of signal amplifiers coupled in cascade, to maintain the phase structure of the received signals substantially unchanged, a signal delay device series coupled in the signal path between the amplifiers, switch means for alternately blocking the input and output signal transmission paths of the delay device for a predetermined time equal to the delay time of the delay device, a source of power for energizing the output amplifier of the cascade and means controlled by the switch means for maintaining said power source disconnected from the output amplifier upon operation of the switch means to block the output transmission path of the delay device.

8. A coherent multi-mode repeater for received signals of the continuous wave and pulse types comprising a plurality of signal amplifiers coupled in cascade, a signal delay device series coupled in the signal path between the amplifiers, switch means for alternately blocking the input and output signal transmission paths of the delay device for a predetermined time equal to the delay time of the delay device, means responsive to the amplitude of received signals when they exceed a predetermined amplitude for substituting a further amplifier having a high power handling capacity for one of the amplifiers of the cascade having a low power handling capacity, a source of power for energizing said further amplifier, means controlled by the signal amplitude responsive means for rendering said source of power effective for energizing said further amplifier only for the duration of signals exceeding a predetermined amplitude and means connecting the switch means to the signal amplitude responsive means to maintain the power source ineffective to energize the further amplifier upon operation of the switch means to block the output transmission path of the delay device.

References Cited in the file of this patent
UNITED STATES PATENTS
3,015,096   Deloraine et al. _____ Dec. 26, 1961